United States Patent
Yamada et al.

(10) Patent No.: US 10,895,464 B2
(45) Date of Patent: Jan. 19, 2021

(54) NAVIGATION DEVICE, RECORDING MEDIUM STORING NAVIGATION PROGRAM, AND NAVIGATION SYSTEM

(71) Applicant: Toyota Jidosha Kabushiki Kaisha, Toyota (JP)

(72) Inventors: Yoshinori Yamada, Nagakute (JP); Takahiro Suzuki, Nagoya (JP); Yosuke Tokuda, Ota-ku (JP); Taiki Nakamura, Toyota (JP); Miyu Tanaka, Miyoshi (JP); Kentaro Otokubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 147 days.

(21) Appl. No.: 16/202,912

(22) Filed: Nov. 28, 2018

(65) Prior Publication Data
US 2019/0212167 A1    Jul. 11, 2019

(30) Foreign Application Priority Data

Jan. 9, 2018   (JP) ................................ 2018-001348

(51) Int. Cl.
*G01C 21/36* (2006.01)
*G01C 21/34* (2006.01)

(52) U.S. Cl.
CPC ..... *G01C 21/3438* (2013.01); *G01C 21/3658* (2013.01); *G01C 21/3407* (2013.01)

(58) Field of Classification Search
CPC ............... G01C 21/34; G01C 21/3407; G01C 21/3415; G01C 21/3438; G01C 21/3446; G01C 21/3453; G01C 21/3476; G01C 21/3484; G01C 21/3691; G01C 21/3694
See application file for complete search history.

(56) References Cited

U.S. PATENT DOCUMENTS

| 8,599,260 | B1 * | 12/2013 | Vaughn ................ G08G 1/0175 |
| | | | 348/149 |
| 8,930,452 | B2 * | 1/2015 | Baalu ..................... G06Q 30/02 |
| | | | 709/204 |
| 9,264,849 | B1 * | 2/2016 | Kahn ...................... G06Q 10/04 |
| 9,651,391 | B1 * | 5/2017 | Hayes ..................... G06Q 50/01 |
| 2008/0319653 | A1 * | 12/2008 | Moshfeghi ......... G01C 21/3608 |
| | | | 701/532 |

(Continued)

FOREIGN PATENT DOCUMENTS

JP    2013-134228 A    7/2013

OTHER PUBLICATIONS https://dekiru.net/article/15206—Google Maps—Apr. 2, 2017.

*Primary Examiner* — Thomas G Black
*Assistant Examiner* — Sara J Lewandroski
(74) *Attorney, Agent, or Firm* — Dinsmore & Shohl LLP (57) ABSTRACT

A navigation device that includes: a memory; and a processor that is configured to: acquire route information relating to a planned route to be traveled by a second vehicle of a user having a friendly relationship with a user of a first vehicle, search for a guided route based on a current position of the first vehicle and the route information, such that at least one of the first vehicle or the second vehicle heads toward a common location, and output route guidance information relating to the guided route to at least one of the first vehicle or the second vehicle.

9 Claims, 9 Drawing Sheets

(56) References Cited

U.S. PATENT DOCUMENTS

| | | | | |
|---|---|---|---|---|
| 2009/0017803 A1* | 1/2009 | Brillhart | ............ | G01C 21/3438 |
| | | | | 455/414.2 |
| 2010/0179756 A1* | 7/2010 | Higgins | ................ | G01C 21/20 |
| | | | | 701/414 |
| 2010/0205242 A1* | 8/2010 | Marchioro, II | .... | G01C 21/3438 |
| | | | | 709/203 |
| 2012/0239584 A1* | 9/2012 | Yariv | ................ | G01C 21/3438 |
| | | | | 705/319 |
| 2013/0231858 A1* | 9/2013 | Bourne | ................ | H04W 4/21 |
| | | | | 701/439 |
| 2014/0005941 A1* | 1/2014 | Paek | ................ | G01C 21/3415 |
| | | | | 701/533 |
| 2014/0278053 A1* | 9/2014 | Wu | ................ | G01C 21/3647 |
| | | | | 701/408 |
| 2014/0297178 A1* | 10/2014 | Luan | ................ | G01C 21/3438 |
| | | | | 701/522 |
| 2016/0192315 A1* | 6/2016 | Paek | ................ | H04W 4/029 |
| | | | | 455/456.1 |
| 2016/0323233 A1* | 11/2016 | Song | ................ | G08G 1/0141 |
| 2017/0019768 A1* | 1/2017 | Yoon | ................ | H04L 69/28 |
| 2017/0134921 A1* | 5/2017 | Meskauskas | ...... | G01C 21/3461 |
| 2017/0371333 A1* | 12/2017 | Nagy | ................ | G01C 21/343 |
| 2018/0058876 A1* | 3/2018 | Xie | ................ | G01C 21/3644 |
| 2019/0063941 A1* | 2/2019 | Walenty | ................ | G01C 21/362 |
| 2019/0197438 A1* | 6/2019 | Meredith | ................ | G06Q 10/047 |
| 2020/0160709 A1* | 5/2020 | Ramot | ................ | G06Q 10/06312 |

\* cited by examiner

| USER NAME | USER ID | VEHICLE LICENSE PLATE NUMBER | VEHICLE TYPE | EMAIL ADDRESS | PROFILE INFORMATION | FRIEND INFORMATION |
|---|---|---|---|---|---|---|
| ICHIRO A. | A1 | TOYODA 99X KI8691 | XXX | abc@... | PLACE OF BIRTH: XX COUNTY, ALMA MATER: XX HIGH SCHOOL | B2(L2), C3(L0), D4(L1), ... |
| JIRO B. | B2 | TOYODA 99Y RA8612 | YYY | def@... | PLACE OF BIRTH: YY COUNTY, ALMA MATER: YY HIGH SCHOOL | A1(L2), C3(L3), D4(L2), ... |
| HANAKO C. | C3 | TOYODA 99Z KU8643 | ZZZ | ghi@... | PLACE OF BIRTH: ZZ COUNTY, ALMA MATER: ZZ HIGH SCHOOL | A1(L0), B2(L3), D4(L1), ... |
| SABURO D. | D4 | TOYODA 99W SU8664 | WWW | jkl@... | PLACE OF BIRTH: WW COUNTY, ALMA MATER: WW HIGH SCHOOL | A1(L1), B2(L2), C3(L1), ... |
| ⋮ | ⋮ | ⋮ | ⋮ | ⋮ | ⋮ | ⋮ |

| USER ID | CURRENT LOCATION | ROUTE INFORMATION |
|---|---|---|
| A1 | LATITUDE: X1, LONGITUDE: Y1 | LOCATION A → LOCATION B → LOCATION C |
| B2 | LATITUDE: X2, LONGITUDE: Y2 | LOCATION X → LOCATION Y → LOCATION Z |
| ... | ... | ... |

NAVIGATION DEVICE, RECORDING MEDIUM STORING NAVIGATION PROGRAM, AND NAVIGATION SYSTEM

CROSS-REFERENCE TO RELATED APPLICATION

This application is based on and claims priority under 35 USC 119 from Japanese Patent Application No. 2018-001348 filed on Jan. 9, 2018, which is incorporated by reference herein.

BACKGROUND

Technical Field

The present disclosure relates to a navigation device, a recording medium storing a navigation program, and a navigation system.

Related Art

Japanese Patent Application Laid-Open (JP-A) No. 2013-134228 discloses a navigation system including a video management section, a relationship management section, and a route candidate generation section. The video management section manages video information in which video data captured at a predetermined location, a capture location of the video data, and a user that captured the video data are associated with each other. The relationship management section manages relationship information that includes relationships between users. When a particular user requests route finding from a departure point to a destination, the route candidate generation section uses the relationship information to extract another user having a high relationship level with the particular user, uses the video information to identify video data captured by the other user, and generates a candidate route from the departure location to the destination location that passes the capture location in the video data.

However, an issue with the technology in JP-A No. 2013-134228 is that it is not possible to share the same location with another user at the same time.

SUMMARY

An aspect of the present disclosure is a navigation device that includes; a memory; and a processor that is configured to: acquire route information relating to a planned route to be traveled by a second vehicle of a user having a friendly relationship with a user of a first vehicle, search for a guided route based on a current position of the first vehicle and the route information, such that at least one of the first vehicle or the second vehicle heads toward a common location, and output route guidance information relating to the guided route to at least one of the first vehicle or the second vehicle.

DESCRIPTION OF EMBODIMENTS

Explanation follows regarding an exemplary embodiment of the present disclosure, with reference to the drawings.

Figure 1:
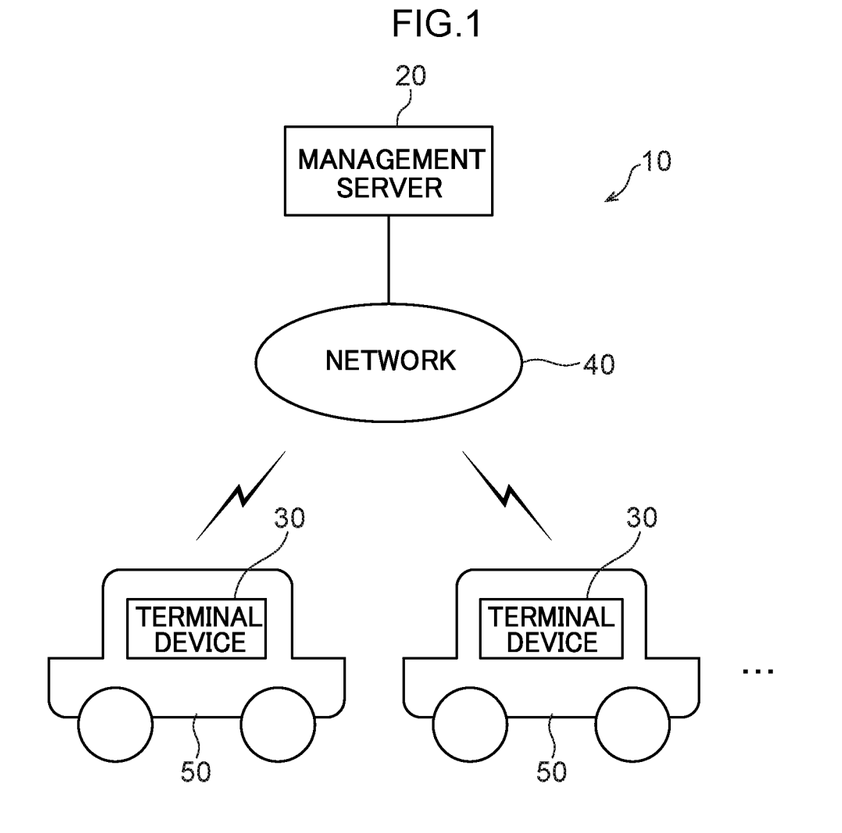
FIG. 1 is a configuration diagram of a navigation system.

FIG. 1 is a block diagram illustrating an example of configuration of a navigation system 10 according to the present exemplary embodiment.

As illustrated in FIG. 1, the navigation system 10 according to the present exemplary embodiment includes a management server 20, serving as an example of a navigation device, and terminal devices 30.

The management server 20 according to the present exemplary embodiment is connected to the terminal devices 30 via a network 40. The management server 20 and the respective terminal devices 30 are connected to each other via the network 40. For example, the internet or a Wide Area Network (WAN) is employed as the network 40.

The management server 20 collects various information from the terminal devices 30 and manages the collected information in a database. The management server 20 also functions as a server providing a Social Networking Service (SNS). Namely, the management server 20 provides a service such as a messaging service, enabling users of the respective terminal devices 30 to communicate with one another.

Each terminal device 30 according to the present exemplary embodiment is installed in a vehicle 50. A car navigation device permanently fixed in the vehicle 50, or a portable terminal device in the possession an occupant of the vehicle 50, such as a smartphone or tablet terminal, may be employed as the terminal device 30.

Figure 2:
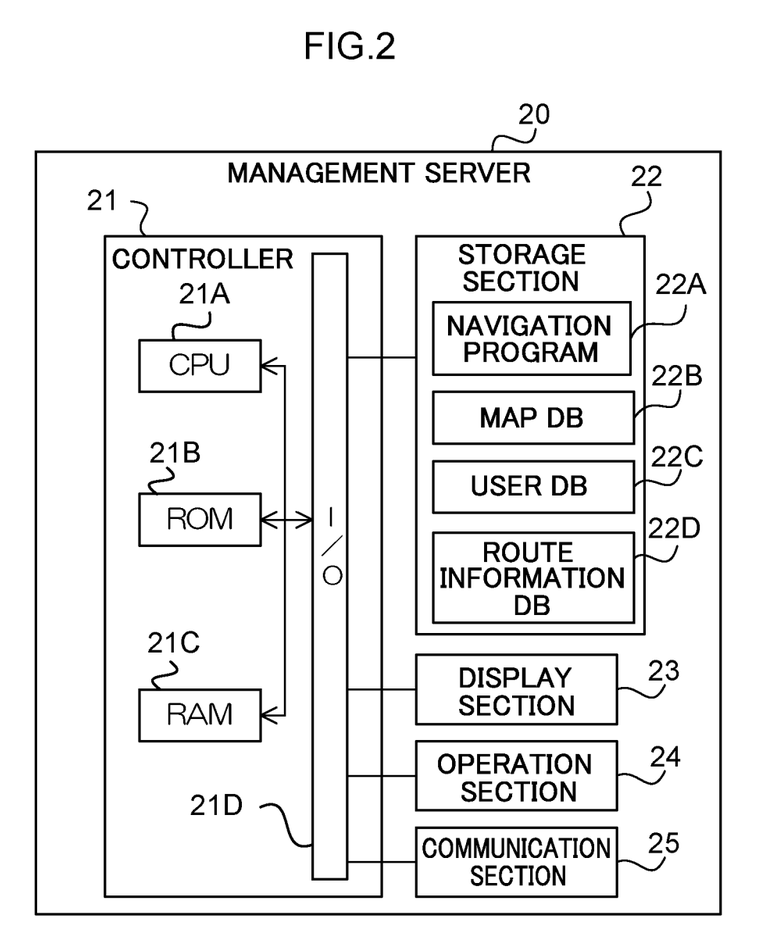
FIG. 2 is a block diagram of a management server.

FIG. 2 is a block diagram illustrating an example of an electrical configuration of the management server 20 according to the present exemplary embodiment.

As illustrated in FIG. 2, the management server 20 according to the present exemplary embodiment includes a controller 21, a storage section 22, a display section 23, an operation section 24, and a communication section 25.

The controller 21 includes a Central Processing Unit (CPU) 21A, Read Only Memory (ROM) 21B, Random Access Memory (RAM) 21C, and an input/output interface (I/O) 21D. Each of these sections are connected together through a bus.

Each functional section, including the storage section 22, the display section 23, the operation section 24, and the communication section 25, is connected to the I/O 21D. Each of these functional sections is capable of two-way communication with the CPU 21A via the I/O 21D.

The controller 21 controls operation of each section of the management server 20, these being the storage section 22, the display section 23, the operation section 24, and the communication section 25.

Examples of the storage section 22 include a Hard Disk Drive (HDD), a Solid State Drive (SSD), flash memory, and the like. The storage section 22 is stored with a navigation program 22A for executing navigation processing according to the present exemplary embodiment. The storage section 22 is also stored with a map database 22B, a user database 22C, and a route information database 22D.

The navigation program 22A may, for example, be pre-installed in the management server 20. Alternatively, the navigation program 22A may be stored in a non-transitory non-volatile storage medium, and the navigation program 22A may be read from the storage medium on which the navigation program 22A is stored, and installed in the management server 20. Alternatively, the navigation program 22A may be acquired via the network 40 and installed in the management server 20.

Examples of the non-volatile storage medium include Compact Disc Read Only Memory (CD-ROM), a magneto-optical disc, a HDD, Digital Versatile Disc Read Only Memory (DVD-ROM), flash memory, or a memory card.

Examples of the display section 23 include a Liquid Crystal Display (LCD) or an organic Electro Luminescence (EL) display.

The operation section 24 is provided with a set of operation keys to receive various instructions from an operator of the management server 20.

The communication section 25 is connected to the network 40, and communicates with the respective terminal devices 30 via the network 40.

The CPU 21A of the management server 20 according to the present exemplary embodiment reads the navigation program 22A stored in the storage section 22 into the RAM 21C and loads the navigation program 22A from the RAM 21C into the CPU 21A to execute the navigation program 22A. The CPU 21A thereby functions as each of the sections illustrated in FIG. 3.

Figure 3:
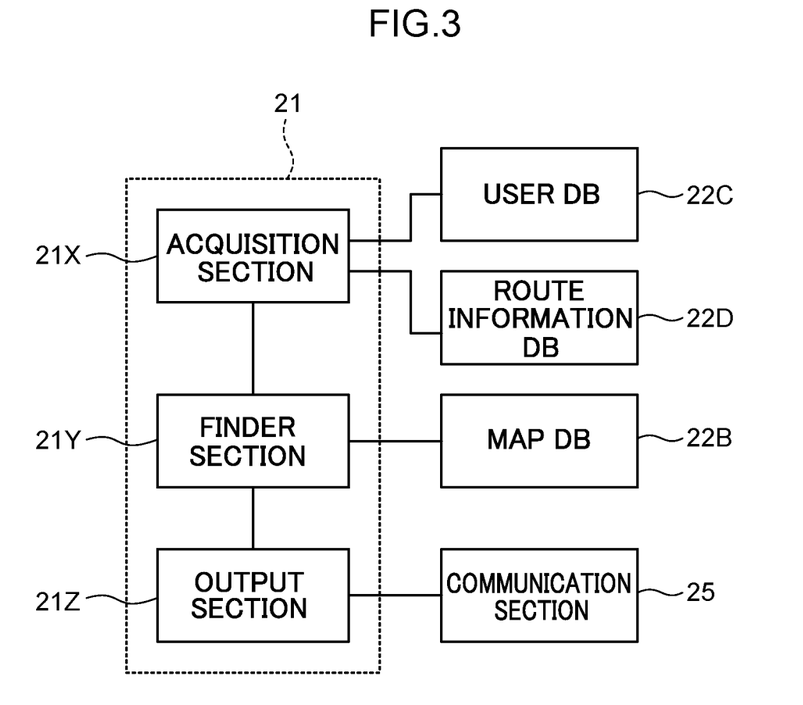
FIG. 3 is a functional block diagram of a management server.

FIG. 3 is a block diagram illustrating an example of functional configuration of the management server 20 according to the present exemplary embodiment.

As illustrated in FIG. 3, the CPU 21A of the management server 20 according to the present exemplary embodiment functions as an acquisition section 21X, a finder section 21Y, and an output section 21Z.

Figure 4:
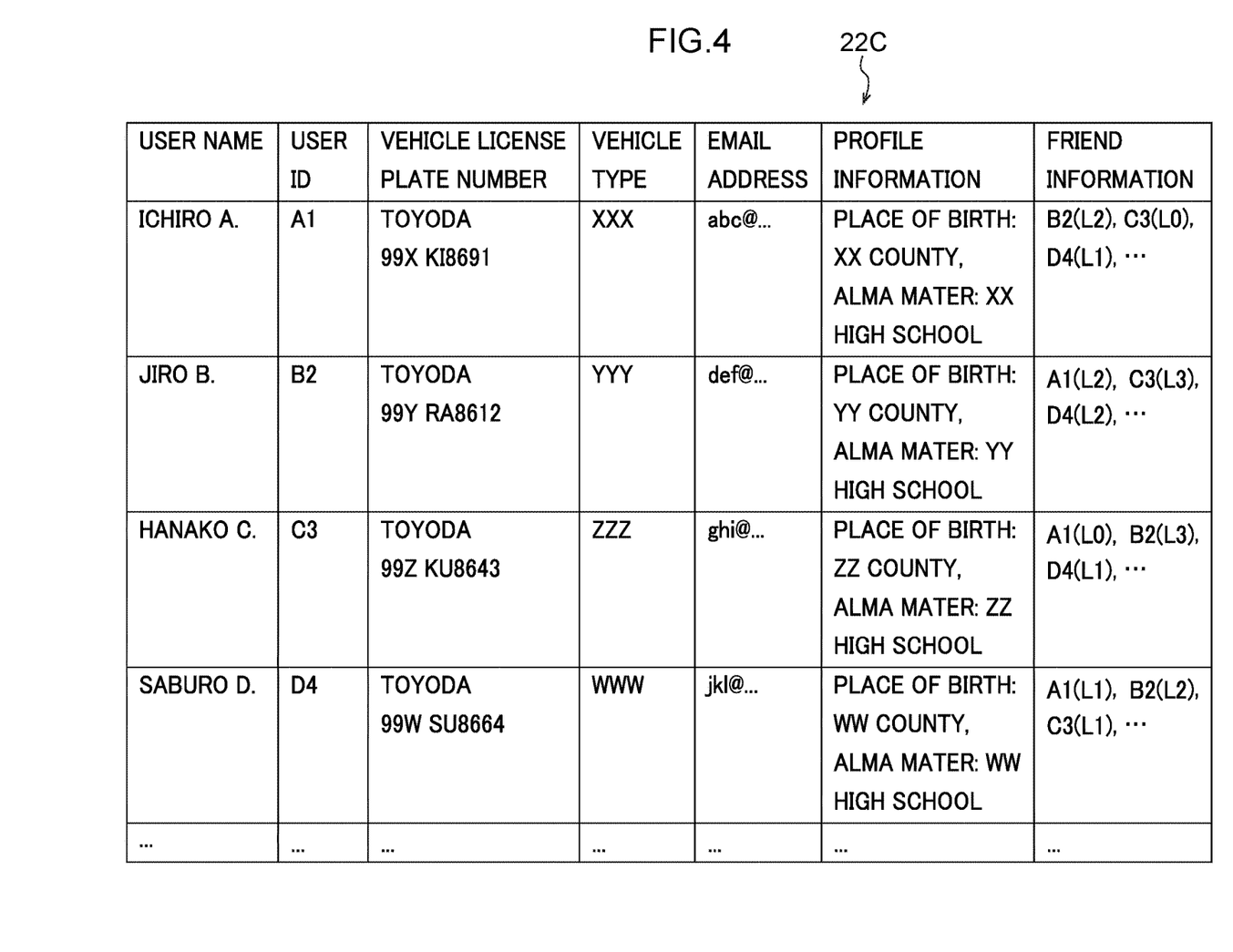
FIG. 4 is a diagram illustrating an example of a data configuration of a user database.

FIG. 4 is a diagram illustrating an example of the user database 22C according to the present exemplary embodiment.

As illustrated in FIG. 4, the user database 22C according to the present exemplary embodiment stores user names representing vehicle occupants, user IDs employed to identify the vehicle occupants, vehicle license plate numbers (registration numbers or vehicle numbers), vehicle types, occupant email addresses, profile information, and friend information, all associated with one another. For example, the profile information includes information representing a user profile, such as the user's date of birth, gender, place of birth, alma mater, and interests, but is not limited thereto.

The friend information includes friendship levels indicating the degree of affinity between users registered on the user database 22C. The friendship levels are set as plural levels, such as levels L0 to L3, with higher appended digits representing greater degrees of affinity. Level L0 indicates that there is no friendly relationship. The friendship levels may be set by deriving a degree of similarity in the various information included in the profile information, with derived degrees of similarity being preset as friendship levels. Namely a higher friendship level may be set for a greater degree of similarity in the profile information. A friendship level setting with respect to another user may be requested via the management server 20, with the friendship level being set in cases in which the other user consents.

In the example of FIG. 4, the user with the user ID A1 has a friendship level of L2 with the user with the user ID B2, has a friendship level of L0 with the user with the user ID C3, and has a friendship level of L1 with the user with the user ID D4.

Figure 5:
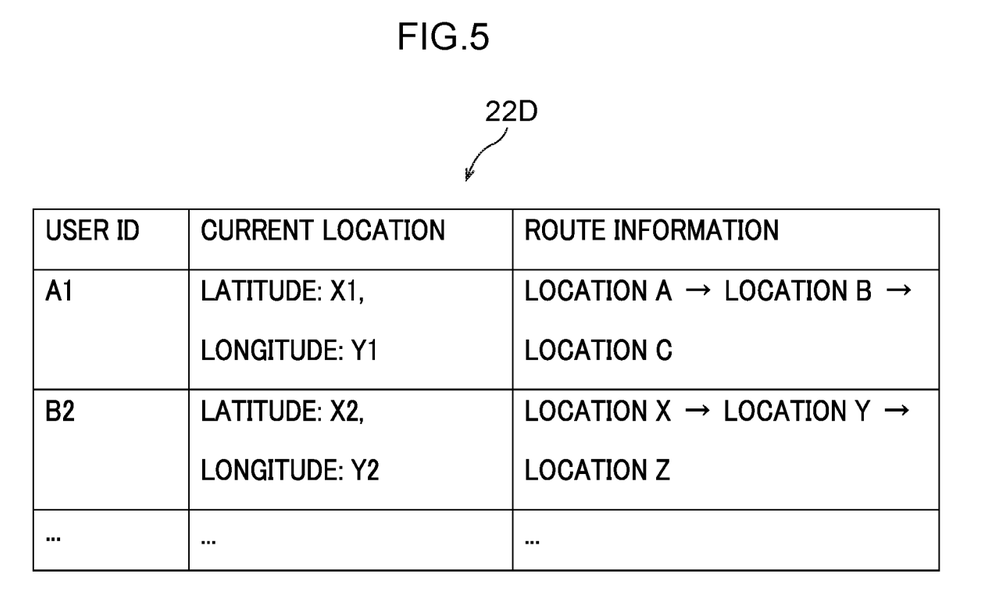
FIG. 5 is a diagram illustrating an example of a data configuration of a route information database.

The route information database 22D illustrated in FIG. 5 is stored with user IDs, current positions, and route information, all associated with one another. The current position is latitude and longitude information representing the current position of the user with the corresponding user ID. The route information includes a planned route of travel to a destination, set by the user with the corresponding user ID. Namely, the route information includes information such as locations that will be passed through on the way to the destination.

Explanation follows regarding the functional sections of the management server 20, with reference to FIG. 3.

The acquisition section 21X references the user database 22C and the route information database 22D to acquire route information regarding a planned route to be traveled by another vehicle (second vehicle), this being a vehicle of a user having a friendly relationship with the user of an ego vehicle (first vehicle), for example a vehicle of a user having a friendship level of L1 or higher. Note that configuration may be made such that route information is acquired regarding a planned route to be traveled by a user having a friendly relationship with the ego vehicle user who is within a predetermined range from the current position of the ego vehicle. In such cases, the predetermined range may be a radius of several kilometers or several dozen kilometers around the current position of the ego vehicle. However, there is no limitation thereto.

The finder section 21Y references the map database 22B to find a guided route such that at least one of the ego vehicle or the other vehicle heads toward a common location, based on the current position of the ego vehicle acquired by the acquisition section 21X and route information of the other vehicle.

The output section 21Z outputs route guidance information relating to the guided route found by the finder section 21Y to at least one of the ego vehicle or the other vehicle via the communication section 25.

Figure 6:
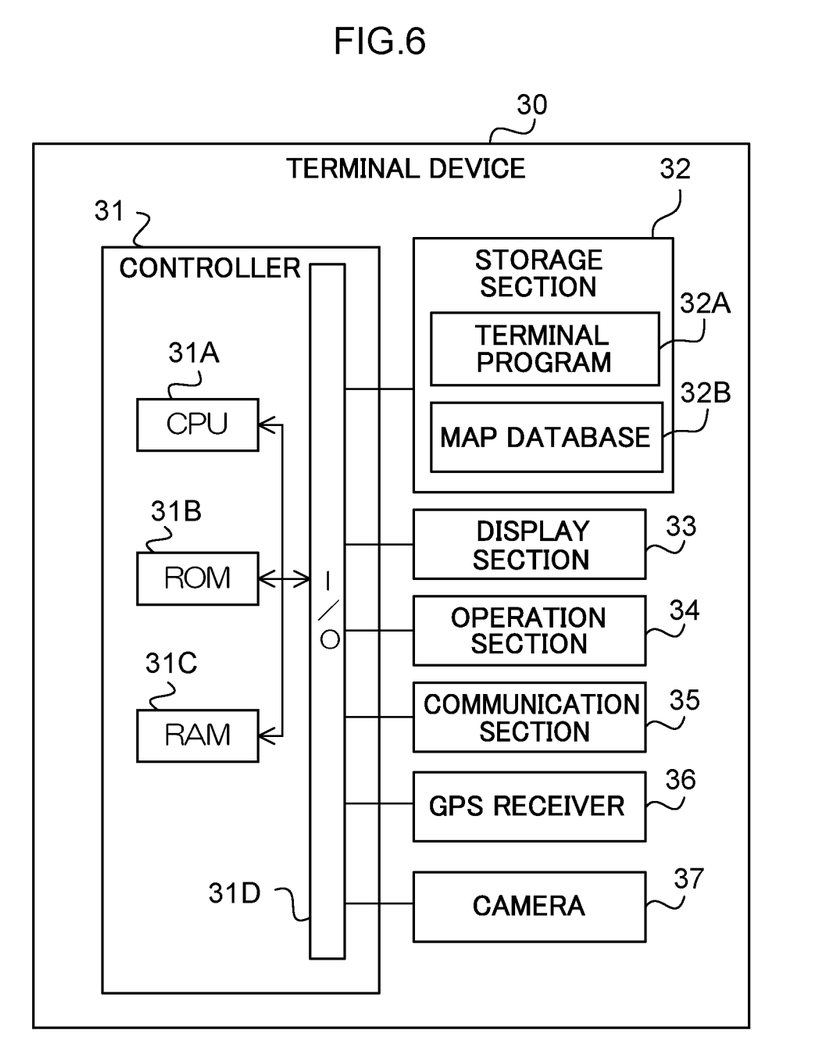
FIG. 6 is a block diagram of a terminal device.

Next, detailed explanation follows regarding the terminal device 30 according to the present exemplary embodiment. FIG. 6 is a block diagram illustrating an example of electrical configuration of the terminal device 30.

As illustrated in FIG. 6, the terminal device 30 includes a controller 31, a storage section 32, a display section 33, an operation section 34, a communication section 35, a Global Positioning System (GPS) receiver 36, and a camera 37.

The controller 31 includes a CPU 31A, ROM 31B, RAM 31C, and an I/O 31D. Each of these sections are connected together through a bus.

Each functional section, including the storage section 32, the display section 33, the operation section 34, the communication section 35, the GPS receiver 36, and the camera 37, is connected to the I/O 31D. Each of these functional sections is capable of two-way communication with the CPU 31A via the I/O 31D.

An SSD, flash memory, or the like may be employed as the storage section 32. The storage section 32 is stored with a terminal program 32A and a map database 32B. The terminal program 32A may be pre-installed in the terminal device 30. Alternatively, the terminal program 32A may be stored in a non-transitory non-volatile storage medium, and the terminal program 32A may be read from the storage medium on which the terminal program 32A is stored and installed in the terminal device 30. Alternatively, the terminal program 32A may be acquired via the network 40 and installed in the terminal device 30.

Examples of the display section 33 include a Liquid Crystal Display (LCD) or an organic EL display.

The operation section 34 is provided with a set of operation keys to receive various instructions from an operator of the terminal device 30.

The communication section 35 is connected to the network 40, and communicates with the management server 20 via the network 40.

The GPS receiver 36 acquires latitude and longitude information of the current position based on signals received from a GPS satellite.

The camera 37 is, for example, configured by a digital camera, and is installed at a position that enables the camera 37 to image ahead of the vehicle 50.

The terminal device 30 includes a map display function to display the current position on a map, and general car navigation functions, such as a route finding function to find and display a route to a destination.

The CPU 31A of the terminal device 30 according to the present exemplary embodiment reads the terminal program 32A stored in the storage section 32 into the RAM 31C, loads the terminal program 32A from the RAM 31C to the CPU 31A, and executes the terminal program 32A.

Figure 7:
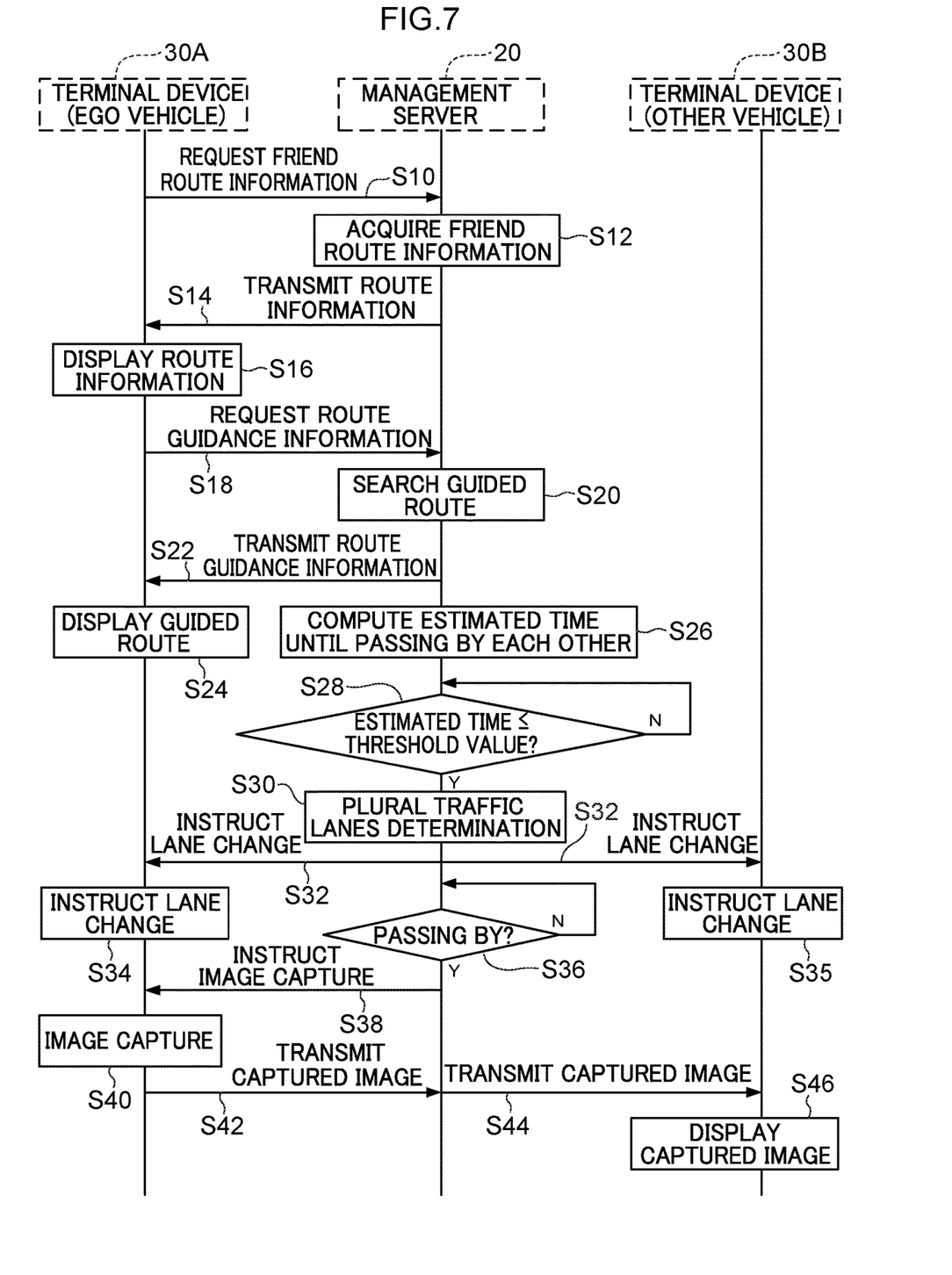
FIG. 7 is a flowchart illustrating a flow of processing in a management server and a terminal device.

Next, explanation follows regarding operation of the management server 20 and the terminal device 30, with reference to FIG. 7. Note that FIG. 7 is a sequence chart illustrating an example of a flow of processing in the navigation program 22A executed by the CPU 21A of the management server 20, and in the terminal program 32A executed by the CPU 31A of the terminal device 30.

In the following explanation, the ego vehicle is referred to as the ego vehicle 50A, and a vehicle of a user having a friendly relationship with the user of the ego vehicle is referred to as another vehicle 50B. The terminal device of the ego vehicle 50A is referred to as the terminal device 30A, and the terminal device of the other vehicle 50B is referred to as the terminal device 30B. Here, a "friendly relationship" does not necessarily mean that the parties are friends in real life, and in the example of the present exemplary embodiment, corresponds to a friendship level of level L1 or higher in the user database 22C.

The terminal devices 30A, 30B of the ego vehicle 50A and the other vehicle 50B periodically transmit current position information computed based on the GPS signals received by the respective GPS receivers 36 to the management server 20. The management server 20 enters the current position information received from the respective vehicles in the route information database 22D associated with the corresponding user IDs.

In cases in which a destination has been set by each user and a route to the destination has been found, the terminal devices 30A, 30B of the ego vehicle 50A and the other vehicle 50B transmit the route information for the found route to the management server 20. In the management server 20, the route information received from the respective vehicles is entered into the route information database 22D.

At step S10 in FIG. 7, the terminal device 30A of the ego vehicle 50A transmits a request signal to the management server 20 requesting route information from another vehicle 50B having a friendly relationship.

At step S12, the management server 20 references the current position information in the route information database 22D and searches for another vehicle present within a predetermined range of the current position of the ego vehicle 50A. Route information relating to the planned route to be traveled by the other vehicle 50B of a user having a friendly relationship with the user of the ego vehicle 50A and that is within the predetermined range of the current position of the ego vehicle 50A is acquired from the route information database 22D. Note that in the example of the present exemplary embodiment, the predetermined range is set to a radius of several kilometers around the current position of the ego vehicle 50A; however, there is no limitation thereto.

At step S14, the management server 20 transmits the route information acquired at step S12 to the ego vehicle 50A.

Figure 8:
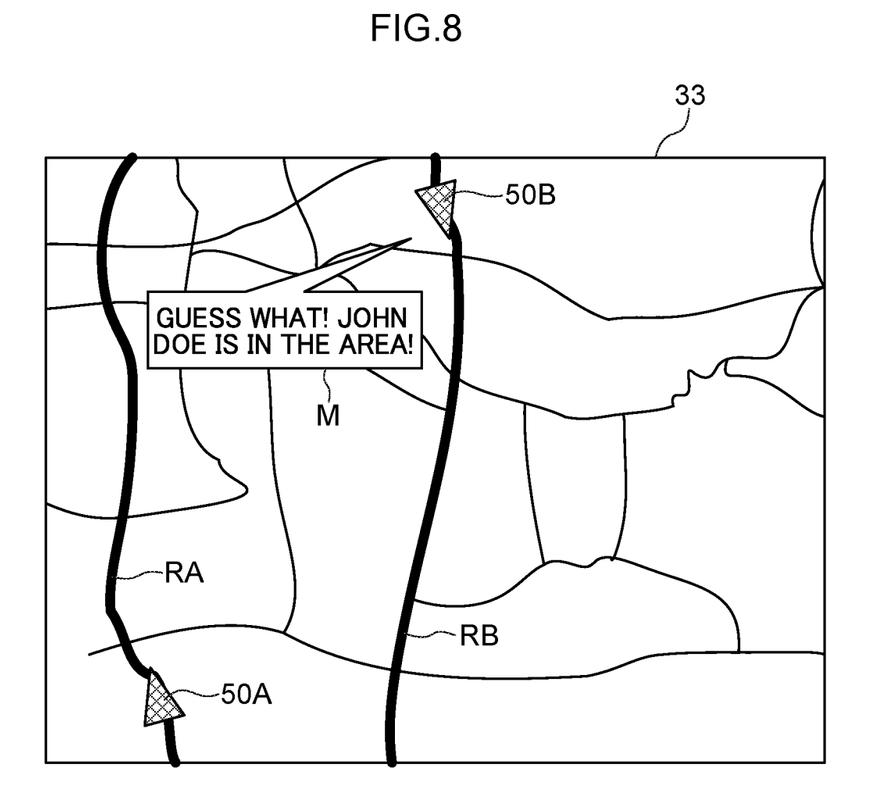
FIG. 8 is a diagram illustrating an example of a display of a terminal device.

At step S16, as illustrated in FIG. 8, the terminal device 30A of the ego vehicle 50A displays on the display section 33 a journey route RA of the ego vehicle 50A, and a journey route RB based on the route information of the other vehicle 50B received from the management server 20. When this is performed, as illustrated in FIG. 8, for example, the journey route RB of the other vehicle 50B may be displayed together with a message M representing the fact that the user of the other vehicle 50B is traveling nearby. In the example of FIG. 8, a message M saying "Guess what! John Doe is in the area!" is displayed on the display section 33. The user of the ego vehicle 50A is thus easily able to ascertain that the other vehicle 50B of a friend is traveling nearby.

At step S18, the terminal device 30A of the ego vehicle 50A transmits a route guidance request signal to the management server 20 to request searching for a guided route such that at least one of the ego vehicle 50A or the other vehicle 50B heads toward a common location. Note that configuration may be made in which the route guidance request signal is only transmitted to the management server 20 in a case in which the user of the ego vehicle 50A has operated the operation section 24 to instruct a route guidance request. Alternatively, configuration may be made in which the route guidance request signal is transmitted to the management server 20 even when not instructed by the user of the ego vehicle 50A.

At step S20, the management server 20 searches for a guided route. Here, the "guided route" may refer to a guided route such that the ego vehicle 50A approaches the other vehicle 50B, namely, a guided route such that the ego vehicle 50A approaches the journey route RB of the other vehicle 50B. Alternatively, the guided route may be a guided route such that the ego vehicle 50A and the other vehicle 50B both approach a common location. Alternatively, the guided route may be a guided route such that the other vehicle 50B approaches the ego vehicle 50A, namely, a guided route such that the other vehicle 50B approaches the journey route RA of the ego vehicle 50A. Note that the route finding function of the terminal device 30A may be set so as to prioritize routes to friends. In a case in which routes to friends are prioritized, configuration may be made such that it is possible to select any guided route of a guided route such that the ego vehicle 50A approaches the journey route RB of the other vehicle 50B, a guided route such that the ego vehicle 50A and the other vehicle 50B approach a common location, or a guided route such that the other vehicle 50B approaches the ego vehicle 50A.

Moreover, the guided route may be a guided route such that the ego vehicle 50A and the other vehicle 50B pass by each other. In the present exemplary embodiment, as illustrated in FIG. 9, explanation is given regarding an example in which a guided route RA2 is found such that the ego vehicle 50A approaches the journey route RB of the other vehicle 50B, and the ego vehicle 50A and the other vehicle 50B pass by each other on the journey route RB of the other vehicle 50B.

At step S22, the management server 20 transmits the found route guidance information to the ego vehicle 50A.

Figure 9:
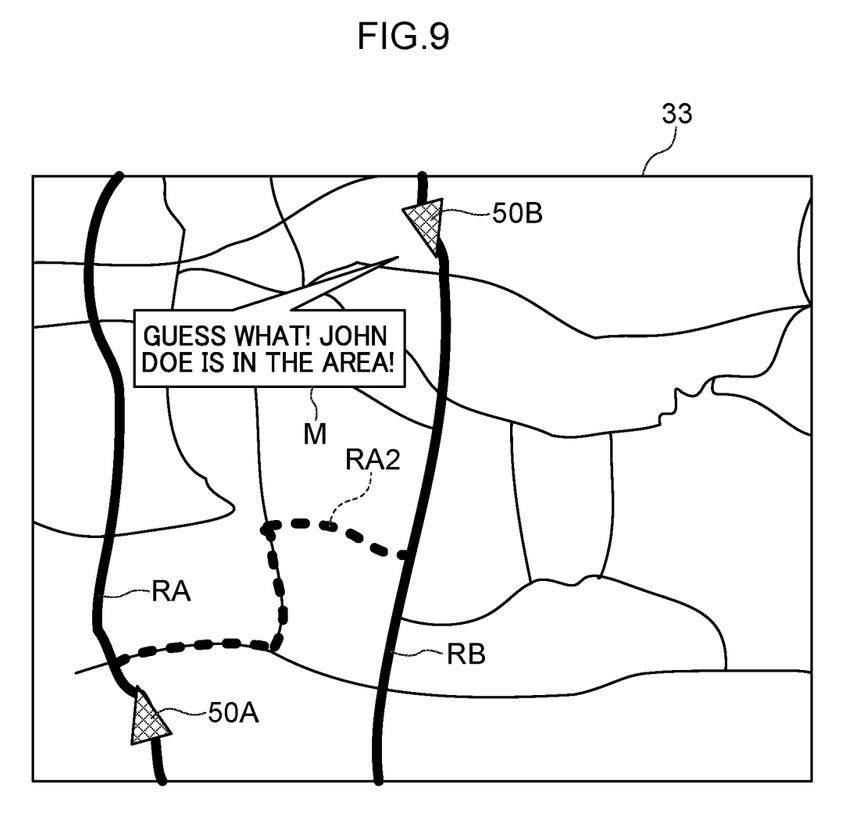
FIG. 9 is a diagram illustrating an example of a display of a terminal device.

At step S24, the terminal device 30A of the ego vehicle 50A displays the guided route RA2 on the display section 33 as illustrated in FIG. 9, based on the route guidance information transmitted by the management server 20. Accordingly, the driver of the ego vehicle 50A drives so as to travel following the guided route RA2. Note that in a case in which a guided route is searched such that the ego vehicle 50A and the other vehicle 50B both approach a common location, route guidance information is also transmitted to the other vehicle 50B.

At step S26, the management server 20 computes an estimated time until the ego vehicle 50A and the other vehicle 50B pass by each other, based on the current positions of the ego vehicle 50A and the other vehicle 50B, and the guided route found at step S20.

At step S28, the management server 20 determines whether or not the estimated time computed at step S26 is a threshold value or lower. The threshold value is, for example, set in the order of several minutes.

In cases in which the estimated time is greater than the threshold value, processing stands by until the estimated time has become the threshold value or lower. In cases in which the estimated time is the threshold value or lower, at step S30, the management server 20 determines whether or not at least one out of the ego vehicle 50A or the other vehicle 50B is traveling on a multi-lane highway with plural traffic lanes. In cases in which at least one out of the ego vehicle 50A or the other vehicle 50B is traveling on a multi-lane highway with plural traffic lanes, at step S32, a lane change instruction signal instructing the vehicle to travel in the traffic lane closest to an oncoming traffic lane from out of the plural traffic lanes is transmitted to the vehicle traveling on the multi-lane highway.

In the present exemplary embodiment, explanation is given regarding a case in which the ego vehicle 50A and the other vehicle 50B are both traveling on multi-lane highway with plural traffic lanes when the ego vehicle 50A travels following the guided mute RA2 and the other vehicle 50B travels following the journey route RB such that the ego vehicle 50A and the other vehicle 50B pass by each other on the journey route RB. In such cases, at step S32, the management server 20 transmits lane change instruction signals to both the ego vehicle 50A and the other vehicle 50B.

When the terminal device 30A of the ego vehicle 50A is instructed to change lanes by the management server 20, at step S34, a message prompting a lane change toward the center of the road is displayed on the display section 33. For example, a message such as "Your friend is about to pass by. Change lanes toward the center of the road" is displayed on the display section 33. This thereby enables the user of the ego vehicle 50A to easily ascertain that that they will shortly pass by a friend. Similarly to the terminal device 30A of the ego vehicle 50A, the terminal device 30B of the other vehicle 50B is also instructed to change lanes by the management server 20. At step S35, a message prompting a lane change toward the center of the road is displayed on the display section 33.

At step S36, the management server 20 references the current position information in the route information database 22D to determine whether or not a timing for the ego vehicle 50A and the other vehicle 50B to pass by each other has been reached based on the current positions of the ego vehicle 50A and the other vehicle 50B.

In cases in which the timing to pass by is determined to have been reached, at step S38, an image capture instruction signal to instruct imaging is transmitted to at least one out of the ego vehicle 50A or the other vehicle 50B. The following explanation concerns a case in which the image capture instruction signal is transmitted to the ego vehicle 50A. However, image capture instruction signals may be transmitted to both the ego vehicle 50A and the other vehicle 50B, or an image capture instruction signal may be transmitted to the other vehicle 50B only.

At step S40, the terminal device 30A instructs the camera 37 to perform imaging. A captured image of the other vehicle 50B is stored in the storage section 32. Note that the captured image may be displayed on the display section 33.

At step S42, the terminal device 30A reads the captured image captured at step S40 from the storage section 32, and transmits the captured image to the management server 20. Note that a message directed at the user of the other vehicle 50B may also be transmitted together with the captured image.

When the management server 20 receives the captured image from the ego vehicle 50A, at step S44, the management server 20 transmits the captured image received from the ego vehicle 50A to the terminal device 30B of the other vehicle 50B.

At step S46, the terminal device 30B of the other vehicle 50B displays the captured image transmitted from the ego vehicle 50A on the display section 33. This thereby enables the user of the other vehicle 50B to see the vehicle in which they are traveling.

In this manner, in the present exemplary embodiment, the guided route for the ego vehicle 50A to approach the other vehicle 50B is searched based on the current position of the ego vehicle 50A and the information relating to the planned route to be traveled by the other vehicle 50B of a user having a friendly relationship with the user of the ego vehicle 50A. This thereby enables the same location to be shared with another user.

Explanation has been given regarding an example of an exemplary embodiment of the present disclosure. However, exemplary embodiments of the present disclosure are not limited to the above, and various modifications may be implemented within a range not departing from the spirit of the present disclosure.

For example, a guided route may be searched according to a friendship level representing a degree of affinity between the user of the ego vehicle 50A and the user of the other vehicle 50B. For example, configuration may be made such that in a case in which the user of the ego vehicle 50A and the user of the other vehicle 50B have a comparatively high friendship level (for example a friendship level of L3), a guided route is found to guide the two parties to a meeting place such as a café or parking area where they can communicate in person, and in a case in which the user of the ego vehicle 50A and the user of the other vehicle 50B have a comparatively low friendship level (for example a friendship level of L1), a guided route is found such that the two parties simply pass by each other.

Moreover, in the present exemplary embodiment, explanation has been given regarding a case in which the camera 37 performs imaging as the ego vehicle 50A and the other vehicle 50B pass by each other in opposite directions. However, at least one out of processing to sound the vehicle horns in coordination, processing to flash the headlights, or processing to reduce the vehicle speed may be performed instead of image capture, or in addition to image capture.

Moreover, in the present exemplary embodiment, explanation has been given regarding a case in which, for example, the management server 20 executes finding of a guided route. However, configuration may be made in which processing of the management server 20 is executed by the terminal device 30A of the ego vehicle 50A. Namely, the navigation program 22A, the user database 22C, and the route information database 22D stored in the storage section 22 of the management server 20 in FIG. 2 may be stored in the storage section 32 of the terminal device 30A, and at least some of the processing of steps S12, S14, S20, S22, S26, S28, S30, S32, S36, S38, and S44 of the management server 20 illustrated in FIG. 7 may be executed by the terminal device 30A.

An object of the present disclosure is to provide a navigation device, a recording medium stored with a navigation program, and a navigation system enabling the same location to be shared with another user at the same time.

A first aspect of the present disclosure is a navigation device that includes: a memory; and a processor that is configured to: acquire route information relating to a planned route to be traveled by a second vehicle of a user having a friendly relationship with a user of a first vehicle, search for a guided route based on a current position of the first vehicle and the route information, such that at least one of the first vehicle or the second vehicle heads toward a common location, and output route guidance information relating to the guided route to at least one of the first vehicle or the second vehicle.

In the first aspect, searching for a guided route such that at least one of the first vehicle or the second vehicle heads toward a common location enables the first vehicle and the second vehicle to approach the common location, thereby enabling the same location to be shared with another user having a friendly relationship at the same time.

A second aspect of the present disclosure is the navigation device of the first aspect, wherein the processor is further configured to search for the guided route such that the first vehicle and the second vehicle pass by each other.

In the second aspect, the first vehicle and the second vehicle are capable of passing by each other, for example, in opposite directions, enabling the vehicle of another user having a friendly relationship to be viewed.

The third aspect of the present disclosure is the navigation device of the second aspect, wherein in a case in which an estimated time until the first vehicle and the second vehicle pass by each other is a predetermined threshold value or less, and at least one vehicle of the first vehicle or the second vehicle is traveling in a lane of a plurality of traffic lanes, the processor is further configured to output a lane instruction signal instructing travel in a lane closest to an oncoming traffic lane of the plurality of traffic lanes.

In the third aspect, instruction is made to travel in the traffic lane closest to the oncoming traffic lane of the plural traffic lanes, thereby enabling the first vehicle and the second vehicle to pass by even closer to each other, enabling the vehicle of another user having a friendly relationship to be more easily viewed.

The fourth aspect of the present disclosure is the navigation device of the second or the third aspect, wherein the processor is further configured to output to at least one of the first vehicle or the second vehicle an image capture instruction signal instructing capture of an image at a timing at which the first vehicle and the second vehicle pass by each other.

In the fourth aspect, an image of the vehicle is captured at the timing at which the first vehicle and the second vehicle pass by each other, enabling an image of the vehicle while traveling to be acquired.

A fifth aspect of the present disclosure is the navigation device of any of the first to the fourth aspects, wherein the processor is further configured to search for the guided route in accordance with the friendship level that represents the affinity between the first vehicle user and the second vehicle user.

In the fifth aspect, a suitable guided route is searched according to the degree of affinity between the user of the first vehicle and the user of the second vehicle.

A sixth aspect of the present disclosure is a non-transitory recording medium storing a navigation program that is executable by a computer to perform a process, the process comprising: acquiring route information relating to a planned route to be traveled by a second vehicle of a user having a friendly relationship with a user of a first vehicle, searching for a guided route based on a current position of the first vehicle and the route information, such that at least one of the first vehicle or the second vehicle heads toward a common location, and outputting route guidance information relating to the guided route to at least one of the first vehicle or the second vehicle.

A seventh aspect of the present disclosure is a navigation system that includes: the navigation device of any of the first to the fifth aspects; and a terminal device that has a display that displays the route guidance information output from the navigation device.

The present disclosure enables the same location to be shared with another user at the same time.

The invention claimed is:

1. A navigation device comprising:
   a memory; and
   a processor that is configured to:
      acquire route information relating to a planned route to be traveled by a second vehicle of a user having a friendly relationship with a user of a first vehicle,
      search for a guided route based on a current position of the first vehicle and the route information, such that at least one of the first vehicle or the second vehicle heads toward a common location, and
      output route guidance information relating to the guided route to at least one of the first vehicle or the second vehicle,
   wherein the processor is further configured to search for the guided route such that the first vehicle and the second vehicle pass by each other, and
   wherein in a case in which an estimated time until the first vehicle and the second vehicle pass by each other is a predetermined threshold value or less, and at least one vehicle of the first vehicle or the second vehicle is traveling in a lane of a plurality of traffic lanes, the processor is further configured to output a lane instruction signal instructing travel in a lane closest to an oncoming traffic lane of the plurality of traffic lanes.

2. The navigation device of claim 1, wherein:
   whether or not the user of the first vehicle and the user of the second vehicle have a friendly relationship is determined based on a friendship level;
   a value of the friendship level is stored in advance in the memory, or is determined based on a degree of similarity between information relating to the users stored in advance in the memory; and
   higher values of the friendship level represent greater degrees of affinity.

3. The navigation device of claim 2, wherein the processor is further configured to search for the guided route in accordance with the friendship level that represents the affinity between the first vehicle user and the second vehicle user.

4. The navigation device of claim 1, wherein the processor is further configured to output to at least one of the first vehicle or the second vehicle an image capture instruction signal instructing capture of an image at a timing at which the first vehicle and the second vehicle pass by each other.

5. A navigation system comprising:
  a navigation device; and
  a terminal device that has a display that displays route guidance information output from the navigation device, wherein
  the navigation device includes:
  a memory; and
  a processor that is configured to:
    acquire route information relating to a planned route to be traveled by a second vehicle of a user having a friendly relationship with a user of a first vehicle,
    search for a guided route based on a current position of the first vehicle and the route information, such that at least one of the first vehicle or the second vehicle heads toward a common location, and
    output route guidance information relating to the guided route to at least one of the first vehicle or the second vehicle,
  wherein the processor is further configured to search for the guided route such that the first vehicle and the second vehicle pass by each other, and
  wherein in a case in which an estimated time until the first vehicle and the second vehicle pass by each other is a predetermined threshold value or less, and at least one vehicle of the first vehicle or the second vehicle is traveling in a lane of a plurality of traffic lanes, the processor is further configured to output a lane instruction signal instructing travel in a lane closest to an oncoming traffic lane of the plurality of traffic lanes.

6. A non-transitory recording medium storing a navigation program that is executable by a computer to perform a process, the process comprising:
  acquiring route information relating to a planned route to be traveled by a second vehicle of a user having a friendly relationship with a user of a first vehicle,
  searching for a guided route based on a current position of the first vehicle and the route information, such that at least one of the first vehicle or the second vehicle heads toward a common location, and
  outputting route guidance information relating to the guided route to at least one of the first vehicle or the second vehicle,
  wherein the process further comprises searching for the guided route such that the first vehicle and the second vehicle pass by each other, and
  wherein in a case in which an estimated time until the first vehicle and the second vehicle pass by each other is a predetermined threshold value or less, and at least one vehicle of the first vehicle or the second vehicle is traveling in a lane of a plurality of traffic lanes, the process further comprises outputting a lane instruction signal instructing travel in a lane closest to an oncoming traffic lane of the plurality of traffic lanes.

7. The non-transitory recording medium of claim 6, wherein the process further comprises outputting to at least one of the first vehicle or the second vehicle an image capture instruction signal instructing capture of an image at a timing at which the first vehicle and the second vehicle pass by each other.

8. The non-transitory recording medium of claim 6, wherein:
  whether or not the user of the first vehicle and the user of the second vehicle have a friendly relationship is determined based on a friendship level;
  a value of the friendship level is stored in advance in a memory, or is determined based on a degree of similarity between information relating to the users stored in advance in the memory; and
  higher values of the friendship level represent greater degrees of affinity.

9. The non-transitory recording medium of claim 8, wherein the process further comprises searching for the guided route in accordance with the friendship level that represents the affinity between the first vehicle user and the second vehicle user.

* * * * *

UNITED STATES PATENT AND TRADEMARK OFFICE
CERTIFICATE OF CORRECTION

PATENT NO. : 10,895,464 B2
APPLICATION NO. : 16/202912
DATED : January 19, 2021
INVENTOR(S) : Yoshinori Yamada et al.

It is certified that error appears in the above-identified patent and that said Letters Patent is hereby corrected as shown below:

In the Specification

In Column 7, Line(s) 41, delete "mute" and insert --route--, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*